United States Patent
Mraz

(10) Patent No.: US 9,094,401 B2
(45) Date of Patent: Jul. 28, 2015

(54) SECURE FRONT-END INTERFACE

(71) Applicant: Owl Computing Technologies, Inc., Ridgefield, CT (US)

(72) Inventor: Ronald Mraz, South Salem, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 108 days.

(21) Appl. No.: 13/770,684

(22) Filed: Feb. 19, 2013

(65) Prior Publication Data
US 2014/0237561 A1      Aug. 21, 2014

(51) Int. Cl.
*H04L 29/06* (2006.01)
*H04L 29/08* (2006.01)

(52) U.S. Cl.
CPC ............ *H04L 63/10* (2013.01); *H04L 63/0209* (2013.01); *H04L 29/08* (2013.01); *H04L 63/083* (2013.01)

(58) Field of Classification Search
CPC ........................................................ H04L 29/08
USPC ................................ 713/153; 709/224; 726/5
See application file for complete search history.

(56) References Cited

U.S. PATENT DOCUMENTS

| | | | |
|---|---|---|---|
| 5,703,562 A | 12/1997 | Nilsen | |
| 8,068,415 B2 | 11/2011 | Mraz | |
| 2001/0044843 A1* | 11/2001 | Bates et al. | 709/224 |
| 2002/0157019 A1* | 10/2002 | Kadyk et al. | 713/201 |
| 2012/0017079 A1* | 1/2012 | Mraz et al. | 713/153 |

* cited by examiner

*Primary Examiner* — Harunur Rashid
*Assistant Examiner* — Angela Holmes
(74) *Attorney, Agent, or Firm* — John S. Economou

(57) ABSTRACT

A secure front-end interface for a PLC, RTU or similar device is disclosed. A first server is coupled to the PLC via a communications link and is configured to receive status information from the device and transmit the information to a second server via a one-way data link. The second server has a network interface for coupling to a network and receives the information from the first server via the one-way data link and outputs the information via the network interface based upon a user request. The front-end interface may further include a second one-way data link coupled from the second server to the first server to allow user command entry. The secure front-end interface may alternatively consist only of a single server coupled between the device and the network which requires a user to enter a password before obtaining access to the status information.

5 Claims, 3 Drawing Sheets

SECURE FRONT-END INTERFACE

FIELD OF INVENTION

This invention relates generally to a secure front-end interface for a PLC or other device capable of outputting status information.

BACKGROUND OF THE INVENTION

A programmable logic controller ("PLC") is a digital computer commonly used for the automation of industrial processes, such as control of machinery used in factory assembly lines, oil refineries, power plants, etc. A remote terminal unit ("RTU") is similar to a PLC, but generally does not provide closed loop control functionality. Both a PLC and RTU may monitor one or more process parameters and provide status signals to a monitoring station, over a communications link such as a local area network ("LAN"). With the growth in the use of wireless communications equipment, it has become commonplace to include a wireless communications interface in PLCs, RTUs and similar devices to output status information. Each such device is connected to a network (wired or via the wireless device) and can be addressed via an associated IP address. This is shown, for example, in FIG. 1 where a PLC 10 includes an interface for coupling to a network 20. This interface may be wired or wireless. However, connection to a network can lead to security issues. For example, if an unprotected wireless network is used or if someone gains access to the network, commands can be issued to PLC 10 which might comprise the associated industrial process. In an oil refinery or power plant, this could lead to significant and severe consequences. In particular, this may be a significant problem for PLCs, RTUs and similar devices which are used only for monitoring a process, because such devices were never intended to allow the preconfigured operating parameters to be changed, even though the communications link provides the ability to do so.

Highly engineered solutions, such as the Owl Computing Technologies Dual Diode, (described in U.S. Pat. No. 8,068, 415, the disclosure of which is incorporated herein by reference) provide a direct point-to-point optical link between network domains in the low-to-high direction or in the low-to-high direction. The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

In such systems, shown as system 100 in block diagram form in FIG. 2, a first server (the Blue Server) 101 includes a transmit application 102 for sending data across a one-way data link, e.g., optical link 104, from a first network domain coupled to server 101 to a second network domain coupled to server 111. First server 101 also includes a transmit (here a phototransmission) component, e.g., optical emitter 103. Transmit application 102 provides data to the optical emitter for transmission across the optical link 104. A second server (the Red Server) 111 includes a receive (here a photodetection) component, e.g., optical detector 113, for receiving data from the optical link 104, which data is then provided to the receive application 112 for further processing. The first server 101 is only able to transmit data to second server 111, since it does not include any receive circuitry (e.g., an optical detector comparable to detector 113) and the second server 11 is only able to receive data from first server 101, since it does not include any transmit circuitry (e.g., an optical emitter comparable to emitter 103).

It is an object of the present invention to provide a front-end interface for a PLC, RTU or similar device which overcomes the problems of the prior art and provides greater protection for the integrity of the PLC, RTU or similar device.

SUMMARY OF THE INVENTION

The present invention provides a front-end interface for a device and, in one embodiment, includes a first server, a one-way data link and a second server. The first server is coupled to the device via a communications link and has an output. The first server is configured to receive information from the device and transmit the information on the output. The one-way data link has an input coupled to the output of the first server and an output. The second server has an input coupled to the output of the one-way data link and a network interface for coupling to a network. The second server is configured to receive the information from the first server via the one-way data link and is further configured to output the information to a user via the network interface based upon a user request received via the network interface. The first server may be configured to poll the device to request transmission of the information from the device to the first server. In one further embodiment, the first server is configured to poll the device at a fixed interval. In another further embodiment, the first server is configured to poll the device on a fixed schedule. The second server may be configured to require that the user enter a password before the requested information is sent to the user. The second server may include a storage device and be configured to store the received information along with identifying information on the storage device. The second server may be configured to allow the user to request information based upon the identifying information.

In a still further embodiment, the front-end interface may further include a second one-way data link having an input coupled to an output on the second server and an output coupled to an input on the first server. In this embodiment, the second server is further configured to allow a user to enter a command for the device and to transmit the entered command to the local server via the second one-way device, and the first server is further configured to receive the command via the second one-way data link and transmit the received command to the device via the communications link. Preferably, the second server may be configured to require that the user enter a password before allowing the user to select or enter the command.

In another embodiment implementing role-based access control, the second server may be configured to require that the user enter a password before allowing the user access to select or enter the command. The command may comprise one of a set of commands. The user may be assigned one of a predetermined set of roles, each role associated with a subset of the set of commands. The second server may be configured to restrict the user to be able to enter or select only commands within the predetermined subset of commands associated with the assigned role.

In an alternative embodiment, the invention comprises a front-end interface for a device, comprising a server coupled to the device via a communications link. The server also has a network interface for coupling to a network. The server is configured to receive information from the device and further configured to output the information to a user via the network interface based upon a user request received via the network interface.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

Figure 1:
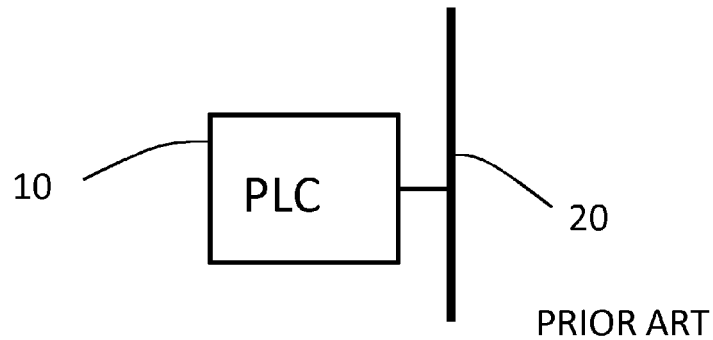
FIG. 1 is a block diagram of a conventional PLC using wired or wireless communications.
Figure 3:
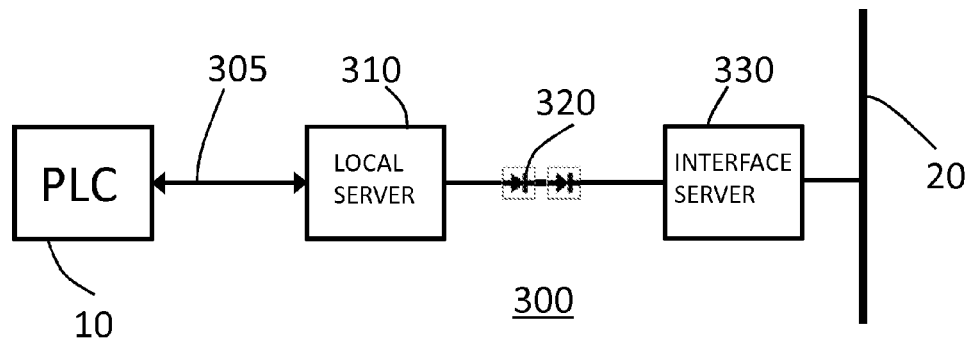
FIG. 3 is a block diagram of a first embodiment of the present invention.

Referring now to the drawings and in particular to FIG. 3, the first preferred embodiment is a system 300 which includes a secure front-end interface for a PLC 10. Although the figures refer to PLC 10, as one of ordinary skill in the art will readily recognize, reference number 10 refers to any device, such as, but not limited to, an RTU, which outputs status information and is capable of communicating with a local device, such as local server 310. Other examples of such devices include network hardware (e.g., gateways, routers, network bridges, switches, hubs, and repeaters), sensors and other devices used in transportation equipment, etc. Local server 310 is communicatively coupled to device 10 via a first communications link 305. The type of link used for link 305 depends on the type of device used and the particular communications port included on that device. For example, the communications port could be one of RS-232, EIA-485 or Ethernet. The protocol used for communications also depends on the particular device, and could be any conventional protocol, e.g., MODBUS.

Figure 2:
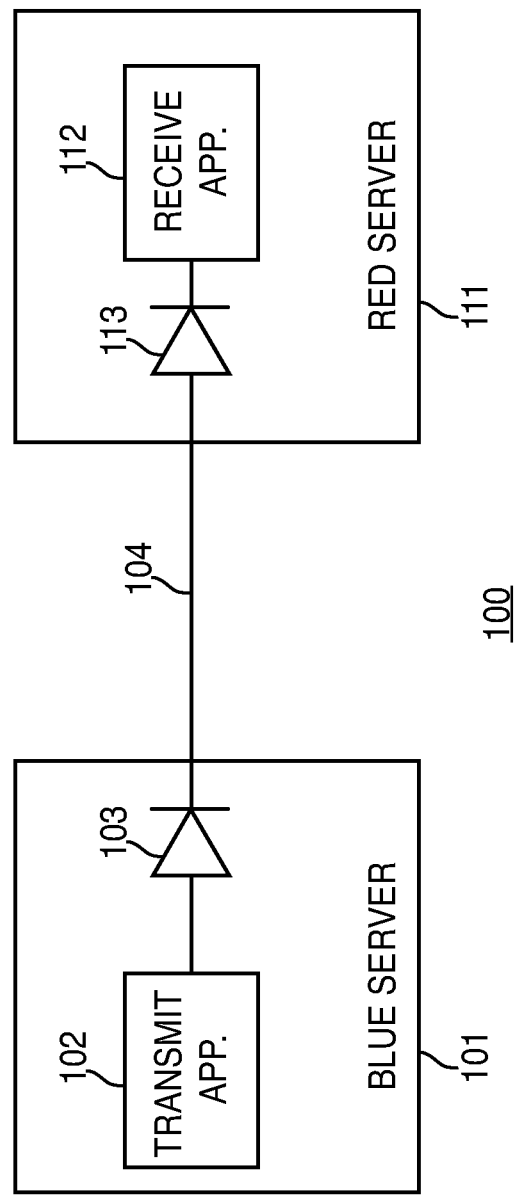
FIG. 2 is a block diagram of a conventional one-way data transfer system.

In operation, local server 310 communicates with (polls) device 10 at predetermined set intervals, requesting status information from device 10. Local server 310 is coupled to a one-way data link 320 (which operates in the same manner as system 100 shown in FIG. 2), which in turn is coupled to an interface server 330. Local server 310 receives the status information from device 10 based on the polling request and then transmits (pushes) the status information to interface server 330 via the one-way data link 320. Device 10 may alternatively be configured to transmit status information to local server 310 without a polling request, at a predetermined interval, predefined schedule, upon the occurrence of a particular event, or combinations thereof. Interface server 330 receives and stores the status information from device 10. Interface server 330 is coupled to a network 20, by a network connection that may be either wireless or wired. A user at a computer (not shown) coupled to network 20 may obtain the status information by addressing the IP address of interface server 330 (the IP address is assigned conventionally). Interface server 330 may be configured to require that the user enter a password before allowing access to the status information. In one embodiment, interface server 330 only maintains the latest status information, discarding all previous status information. In another embodiment, interface server 330 includes a data storage device and acts as a local historian, storing the status information and associated time/date information for longer periods of time. The actual period depends on the size of the storage device and the amount of status information to be saved for each polling record. As one of ordinary skill in the art will readily recognize, system 300 allows an outside user to access status information from device 10 without any ability to transmit a command which might alter the operation of device 10, due to the one-way nature of data link 320. Even though the user may access interface server 330, the one-way nature of data link 320 prevents any information from flowing to device 10 (via the local server 310).

Although the communications link 305, local server 310, one-way data link 320 and interface server 330 are shown in FIG. 3 as being separate from device 10, as one of ordinary skill in the art will readily recognize, such elements may be integrated into device 10 as well, thus allowing, after installation, communications which allow status information to flow out of device 10, but preventing any commands from being provided into device 10 and thus preventing any user from issuing commands that change any preset parameters for device 10.

Figure 4:
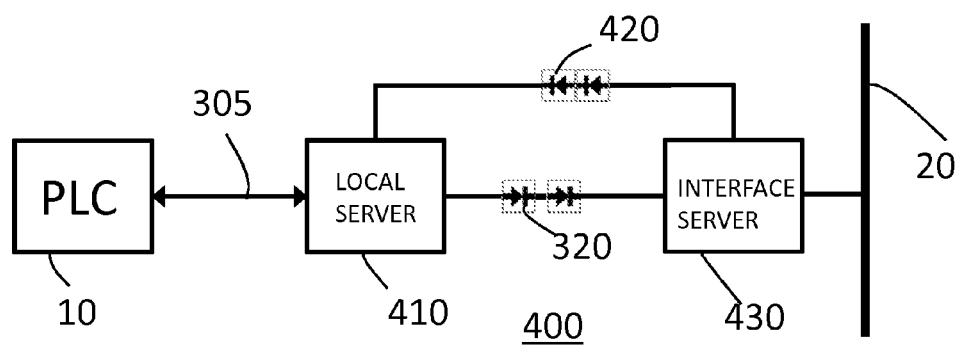
FIG. 4 is a block diagram of a second embodiment of the present invention.

In some situations, however, it may be desirable to allow an authorized user to issue commands to device 10. The system 400 provided in FIG. 4 provides this capability. System 400 includes an interface server 430 coupled to network 20 and a local server 410 that is coupled to device 10 via link 305. However, two one-way links are provided between interface server 430 and local server 410, a first one-way link 320 that allows data to pass from local server 410 to interface server 430 and a second one-way link 420 that allows data to pass from interface server 430 to local server 410. Local server 410 is configured to poll device 10 (or otherwise receive status information) in the same manner as in the FIG. 3 embodiment, and then push the status information received from device 10 across one-way link 320 to interface server 430. In addition, local server 410 is configured to receive commands from the one-way link 420 and then transmit such commands to device 10. In this regards, as one of ordinary skill in the art will readily recognize, in this situation a command includes the particular command string along with any parameters required to carry out such command.

Interface server 430 in FIG. 4 is configured to receive the status information from one-way link 320 in the same manner as in the FIG. 3 embodiment (either making only the latest status information available to the user or including a storage device to allow access to historical as well as current status information). In addition, interface server 430 is configured to allow a user to issue commands to device 10 via a user interface. The user interface may require the user to enter a password before allowing access to command entry (command entry may be via a command line in which the user enters the commands or by a menu system in which the user selects the desired command, for example). In addition, access may be provided on a Role-Based Access Control (RBAC) model. RBAC methods restrict access to information and ability to perform operations to a subset of the resources in a system, depending on the particular role or roles an individual user has in an organization. RBAC methods provide an additional layer of protection for the various assets and components of an operational environment, even when these are located in the same physical space as no-operational systems or share computational resources with them. Furthermore, RBAC methods simplify the process of changing access permissions as a person changes roles within an organization, as the permissions are linked to a role and not a person. In operation, a user may enter commands for device 10, after appropriate validation of the user's credentials, based on password entry alone or with additional RBAC-based limitations. Interface server 430 transmits such commands to local server 410 via one-way link 420, and local sever 410 receives and forwards such commands to device 10 via communications link 305. System 400 prevents unauthorized access to device 10 by transmitting status information over one-way link 320, while at the same time allowing a user, after being duly authorized via a password alone or by a combination of password and RBAC-based limitation, to issue commands to device 10.

Figure 5:
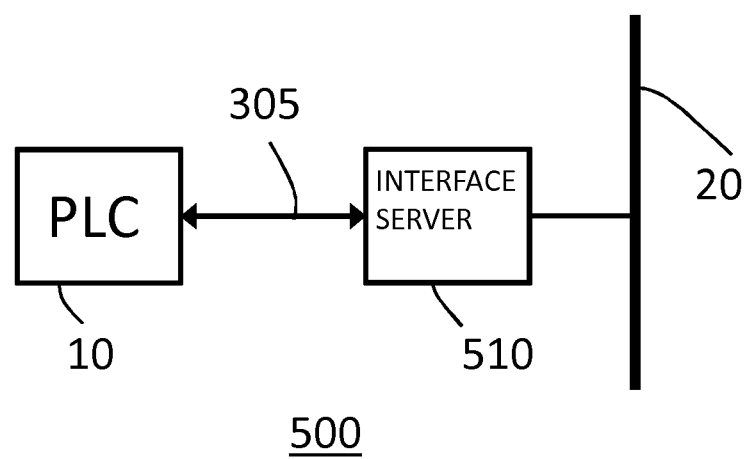
FIG. 5 is a block diagram of a third embodiment of the present invention.

Finally, FIG. 5 shows an alternative embodiment 500 which does not require any hardware-based one-way data links. Instead, interface server 510 is directly coupled to device 10 via a two-way communications link 305, and is also coupled via a network connection to network 20. As with prior embodiments, the network connection is conventional and may be wired or wireless. Interface server 510 is configured to receive the status information from communications link 305, either making only the latest status information available to a user connected to network 20, or including a storage device to allow access to historical as well as current status information. In addition, interface server 510 is configured to allow a user to issue commands to device 10 via a user interface. The user interface may require the user to enter a password before allowing access to command entry. In addition, access may be provided on a RBAC model, as discussed above. In operation, a user may enter commands for device 10 via a connection to interface server 510, after appropriate validation of the user's credentials, based on password entry alone or with additional RBAC-based limitations. Furthermore, additional security can be obtained by requiring that the user connect to interface server 510 via a secure shell (SSH) connection. Interface server 510 transmits such commands to device 10 via two-way communications link 305. System 500 prevents unauthorized access to device 10 by restricting the issue of commands to device 10 only to users duly authorized via a password alone or by a combination of password and RBAC-based limitation.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A front-end interface for a device, comprising:
a first server coupled to a device via a dedicated communications link and having an output, the first server configured to receive information from the device and forward the information on the output;
a first one-way data link having an input coupled to the output of the first server and an output, the first one-way data link configured to allow information to pass from the input to the output and to prevent any signal from passing from the output to the input;
a second server having an input coupled to the output of the first one-way data link and a network interface for coupling to a network, the second server configured to receive the information from the device forwarded from the first server via the one-way data link, the second server further configured to output the information to a user via the network interface based upon a user request received via the network interface for the information from the device;
a second one-way data link having an input coupled to an output on the second server and an output coupled to an input on the first server, the second one-way data link configured to allow information to pass from the input to the output and to prevent any signal from passing from the output to the input,
wherein the second server is further configured to allow a user to enter a command for the device and to transmit the entered command to the first server via the second one-way device; and
wherein the first server is further configured to receive the command via the second one-way data link and transmit the received command to the device via the communications link.

2. The front-end interface of claim 1, wherein the second server is configured to require that the user enter a password before allowing the user to select or enter the command.

3. The front-end interface of claim 1, wherein the second server is configured to require that the user enter a password before allowing the user access to select or enter the command, wherein the command comprises one of a set of commands, wherein the user is assigned one of a predetermined set of roles, each role associated with a subset of the set of commands, wherein the second server is configured to restrict the user to be able to enter or select only commands within the predetermined subset of commands associated with the assigned role.

4. The front-end interface of claim 1, wherein the device is one of a programmable logic controller (PLC), a Remote Terminal Unit (RTU), a network gateway, a network router, a network bridge, a network switch, a network hub, a network repeater or a sensor.

5. The front end interface of claim 1, wherein the second server is coupled to the first server only via the first one-way data link and the second one-way data link.

* * * * *